(12) United States Patent
Itagaki et al.

(10) Patent No.: US 7,511,089 B2
(45) Date of Patent: Mar. 31, 2009

(54) POLYPHENYLENE ETHER OLIGOMER SULFONIC ACID SALT, MAKING METHOD, FLAME RETARDANT RESIN COMPOSITION, AND MOLDED ARTICLE

(75) Inventors: Akinari Itagaki, Gunma-ken (JP); Masaki Tanaka, Tokyo (JP); Masaaki Yamaya, Gunma-ken (JP); Takahiro Adachi, Kamisu (JP); Yasumasa Norisue, Tokyo (JP); Satoshi Kanayama, Tokyo (JP)

(73) Assignees: Shin-Etsu Chemical Co., Ltd., Tokyo (JP); Mitsubishi Gas Chemical Company, Inc., Tokyo (JP)

( * ) Notice: Subject to any disclaimer, the term of this patent is extended or adjusted under 35 U.S.C. 154(b) by 600 days.

(21) Appl. No.: 11/220,702

(22) Filed: Sep. 8, 2005

(65) Prior Publication Data

US 2007/0232730 A1     Oct. 4, 2007

(30) Foreign Application Priority Data

Sep. 9, 2004    (JP)    ............... 2004-261872
Oct. 26, 2004   (JP)    ............... 2004-310851
Oct. 26, 2004   (JP)    ............... 2004-310876

(51) Int. Cl.
       *C08K 5/42*   (2006.01)
(52) U.S. Cl. .................. 524/158; 524/161; 524/162; 524/163; 524/164; 528/171
(58) Field of Classification Search ................ 524/158, 524/161, 162, 163, 164; 528/171
See application file for complete search history.

(56) References Cited

U.S. PATENT DOCUMENTS

| | | | |
|---|---|---|---|
| 4,110,307 A | 8/1978 | Mark | |
| 4,391,935 A | 7/1983 | Bialous et al. | |
| 5,061,745 A | 10/1991 | Wittmann et al. | |
| 5,204,394 A | 4/1993 | Gosens et al. | |
| 6,657,008 B2 | 12/2003 | Iwashita et al. | |
| 6,706,825 B2 | 3/2004 | Itagaki et al. | |
| 6,794,481 B2 | 9/2004 | Amagai et al. | |
| 2003/0035208 A1 | 2/2003 | Engelhardt | |
| 2003/0130438 A1 | 7/2003 | Amagai et al. | |
| 2004/0214004 A1 | 10/2004 | Amagai et al. | |

FOREIGN PATENT DOCUMENTS

| | | |
|---|---|---|
| JP | 51-45159 | 4/1976 |
| JP | 52-4547 | 2/1977 |
| JP | 2-32154 A | 2/1990 |
| JP | 2-115262 A | 4/1990 |
| JP | 6-73281 A | 3/1994 |
| JP | 8-302120 A | 11/1996 |
| JP | 11-172063 A | 6/1999 |
| JP | 2002-167499 A | 6/2002 |
| JP | 2003-12796 A | 1/2003 |
| JP | 2003-64229 A | 3/2003 |
| JP | 2003-213125 A | 7/2003 |
| JP | 2003-253109 A | 9/2003 |
| JP | 2003-253110 A | 9/2003 |
| JP | 2004-35587 A | 2/2004 |
| JP | 2004-155938 A | 6/2004 |

OTHER PUBLICATIONS

Database WPI, Section Ch, Week 200410, Derwent Publications Ltd., London, GB; AN 2004-093863; XP002363709 & JP 2003 213125 A (Idemitsu Petrochem Co Ltd) Jul. 30, 2003 *abstract*.

*Primary Examiner*—Edward J Cain
(74) *Attorney, Agent, or Firm*—Birch, Stewart, Kolasch & Birch, LLP

(57) ABSTRACT

An alkali metal or alkaline earth metal salt of sulfonic acid of polyphenylene ether oligomer is useful as a modifier for thermoplastic resins, typically as a flame retardant, compatibilizing agent or antistatic agent.

11 Claims, No Drawings

POLYPHENYLENE ETHER OLIGOMER SULFONIC ACID SALT, MAKING METHOD, FLAME RETARDANT RESIN COMPOSITION, AND MOLDED ARTICLE

CROSS-REFERENCE TO RELATED APPLICATION

This non-provisional application claims priority under 35 U.S.C. §119(a) on Patent Application Nos. 2004-261872, 2004-310851 and 2004-310876 filed in Japan on Sep. 9, 2004, Oct. 26, 2004 and Oct. 26, 2004, respectively, the entire contents of which are hereby incorporated by reference.

TECHNICAL FIELD

This invention relates to a novel polyphenylene ether oligomer sulfonic acid salt useful as a modifier for thermoplastic resins, typically a flame retardant, compatibilizing agent, and antistatic agent, and a method of preparing the same. It also relates to a flame retardant resin composition exhibiting good flame retardance without a need for halogen-based flame retardants containing bromine, chlorine or similar elements causing environmental pollution or phosphorus-based flame retardants, and an article molded therefrom.

BACKGROUND ART

While a variety of modifiers which can be compounded in thermoplastic resins as flame retardants, compatibilizing agents, antistatic agents or the like are known in the art, there is a continuous need for novel modifiers. For example, JP-A 8-302120 describes a thermoplastic resin having a sulfonate salt group as a polar group and specifically uses maleic anhydride-modified polyphenylene ether in Examples, but does not refer to its general structure and preparation method. JP-A 2003-213125 describes a polar group-modified polyphenylene ether which serves as a compatibilizing agent for polyamide resins and polystyrene resins, with sulfonate salt groups being exemplified as the polar group. In Examples, maleic anhydride-modified polyphenylene ether is used as in the previous JP-A 8-302120. Since the maleic anhydride-modified polyphenylene ether is prepared by radical modification, it is deemed to have such a structure that a polar group is introduced at the 2-methyl position on the terminal phenol forming the polyphenylene ether skeleton. A percent acid modification is calculated to be 2% or less. It is presumed to be a polymer having a weight average molecular weight of about 20,000 since the process starts with a polyphenylene ether having an intrinsic viscosity of 0.47 dl/g.

Meanwhile, polycarbonate resins are widely used in the industry including automobile, business machine, electric and electronic fields. In those applications such as business machines and electric and electronic equipment among others, it is strongly desired that the resin materials used be flame retardant. To meet such a demand, a number of flame retardants have been developed and investigated. In the prior art, for rendering polycarbonate resins flame retardant, bromine compounds are exclusively used. Sometimes antimony trioxide is used in combination. Resin compositions containing such compounds, however, suffer from the problem that they evolve bromine gas when burned, causing environmental pollution. Recently it was reported to use phosphorus based flame retardants (e.g., phosphoric esters) alone or in combination with bromine compounds for the purpose of reducing the amount of bromine compounds used. The phosphorus based flame retardants have the drawback that they decompose during service, detracting from the mechanical strength of the resin compositions. They do not fully overcome the problem of environmental pollution.

The non-phosphorus flame retardant materials or non-phosphorus, non-bromine flame retardant materials which are known in the art include a flame retardant polycarbonate resin composition comprising an alkali metal or alkaline earth metal salt of an organic acid such as sulfonic acid, polytetrafluoroethylene, and an aromatic polycarbonate (JP-A 51-45159); a flame retardant polycarbonate resin composition comprising a polycarbonate, an alkali metal or alkaline earth metal salt of perfluoroalkanesulfonic acid, and an epoxy resin (JP-A 6-73281); and a flame retardant polycarbonate resin composition comprising a polycarbonate resin, a metal salt of aromatic sulfur compound, a fluorinated polymer of fibrillation type, and an organopolysiloxane (JP-A 2004-155938). These flame retardant polycarbonate resin compositions, however, have several drawbacks. The transparency characteristic of polycarbonate resin is lost. Also, if the flame retardant is added in a sufficient amount to exert flame retardant effect, it can compromise the heat stability of the resin composition in the melt, resulting in molded parts suffering from yellowing, silver streaking and even a substantial reduction of mechanical strength.

JP-A 2003-64229 discloses a flame retardant polycarbonate resin composition comprising a polycarbonate resin and a sulfonic acid metal salt of a styrenic polymer in which aromatic monomer units having a sulfonic acid group incorporated in the aromatic skeleton account for 15 to 45 mol % of the entire monomer units and which contains up to 5% by weight of a metal sulfuric acid salt. This composition is thermally unstable, prone to yellowing and unsatisfactorily weather resistant.

The above-described resin compositions having halogen- or phosphorus-free flame retardants compounded therein have several drawbacks that they achieve only insufficient flame retardance, or if the flame retardant is added in a sufficient amount to exert flame retardant effect, it can compromise the heat stability of the resin composition in the melt, resulting in molded parts suffering from yellowing and even a substantial reduction of mechanical strength.

To further enhance or improve the properties of polycarbonate resins, a number of polymer alloys thereof with other thermoplastic resins have been developed. One typical polymer alloy is a composition comprising a polycarbonate resin and a styrene/acrylonitrile graft copolymer such as ABS resin which is used in automobile, electric and electronic and other fields as a thermoplastic resin material having excellent mechanical, rheological and thermal properties. Where flame retardance is required, a flame retardant is added to the composition. Halogen-free flame retardant materials which are known to impose a less burden to the environment include materials having phosphorus-based flame retardants compounded in resin compositions comprising a polycarbonate resin and an ABS resin (see JP-A 2-115262 and JP-A 2-32154). They still suffer from a drop of deflection temperature under load and mold deposits.

JP-A 11-172063 discloses a resin composition comprising a resin composition composed of a polycarbonate resin, an ABS resin and the like, and a sulfonic acid metal salt of polystyrene. If the sulfonic acid metal salt of polystyrene is added in a sufficient amount to exert flame retardant effect, the resulting resin composition has a lower impact strength and a lower deflection temperature under load, and the molded parts have an unsatisfactory outer appearance. JP-A 2002-167499 discloses a flame retardant resin composition comprising a polycarbonate resin, a styrene resin, and a polymer comprising silicon, boron and oxygen, having a skeleton consisting essentially of silicon-oxygen bonds and boron-oxygen bonds and having an aromatic ring in a molecule ether oligomer having the structural formula (8) with a compound selected from among sodium hydrogen sulfite, potassium hydrogen sulfite, sodium disulfite, and potassium disulfite, in a polar organic solvent and in the presence of water.

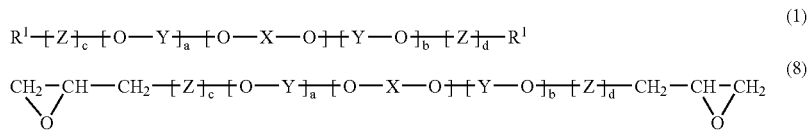

although it is insufficient in flame retardance and impact strength. JP-A 2004-35587 discloses a resin composition comprising a polycarbonate resin, a styrene resin, an organic alkali metal salt and/or organic alkaline earth metal salt, and a functional group-containing silicone compound although it has a low impact strength and weld strength.

As mentioned above, resin compositions comprising polycarbonate resins, styrene resins such as ABS resins and flame retardants are less practical in that their deflection temperature under load, impact strength, and weld strength are low, they leave mold deposits and provide a defective outer appearance.

SUMMARY OF THE INVENTION

An object of the present invention is to provide a novel polyphenylene ether oligomer sulfonic acid salt suitable to be compounded in thermoplastic resins as a flame retardant, compatibilizing agent, antistatic agent or the like, and a method of preparing the same. Another object of the present invention is to provide a flame retardant resin composition which eliminates the use of halogen- and phosphorus-based flame retardants causing environmental pollution or performance deterioration, clears a rigorous flame retardance level comparable to the use of such flame retardants, and is improved in mechanical strength, thermal stability and the like, and an article molded therefrom.

The inventors have found that an alkali metal or alkaline earth metal salt of sulfonic acid of polyphenylene ether oligomer having the structural formula (1) is effective as a flame retardant or the like.

It has also been found that a resin composition comprising a polycarbonate resin or a polycarbonate resin and a styrene resin such as ABS resin, and a minor amount of an alkali metal or alkaline earth metal salt of sulfonic acid of polyphenylene ether oligomer clears the rigorous flame retardance level in that when the polycarbonate resin is burned, a large amount of carbide is formed, which carbide covers the surface of the resin being burned, thus delaying decomposition gases evolving in the interior of the resin from being supplied to the burning site. Since the sulfonic acid salt of polyphenylene ether oligomer is highly compatible with a resin composition comprising a polycarbonate resin or a polycarbonate resin and a styrene resin, the compounding of the salt in the polycarbonate resin maintains satisfactory mechanical strength and outer appearance.

In first and second aspects, the present invention provides an alkali metal or alkaline earth metal salt of sulfonic acid of polyphenylene ether oligomer having the structural formula (1); and a method for preparing an alkali metal or alkaline earth metal salt of sulfonic acid of polyphenylene ether oligomer having the structural formula (1), comprising the step of reacting epoxy groups at opposite ends of a polyphenylene Herein —[O—X—O]— has the structural formula (2):

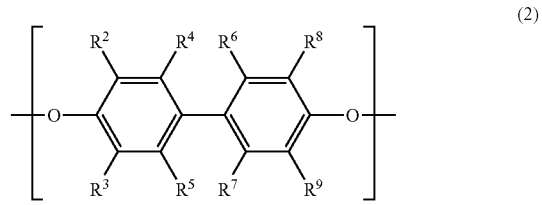

wherein each of $R^2$, $R^3$, $R^4$, $R^8$ and $R^9$ which may be the same or different is a halogen atom, alkyl of up to 6 carbon atoms or phenyl, each of $R^5$, $R^6$ and $R^7$ which may be the same or different is a hydrogen atom, halogen atom, alkyl of up to 6 carbon atoms or phenyl.

—[Y—O]— is a structure of one type having the structural formula (3) or a random array of structures of at least two types having the structural formula (3):

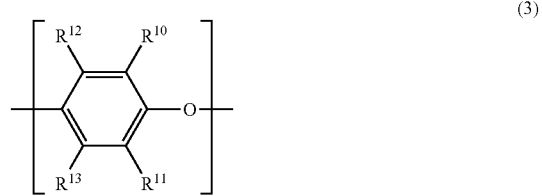

wherein each of $R^{10}$ and $R^{11}$ which may be the same or different is a halogen atom, alkyl of up to 6 carbon atoms or phenyl, each of $R^{12}$ and $R^{13}$ which may be the same or different is a hydrogen atom, halogen atom, alkyl of up to 6 carbon atoms or phenyl.

Z is a divalent organic group of 1 to 6 carbon atoms which may contain an oxygen atom.

$R^1$ essentially contains a structure having the structural formula (4):

$R^1$ may be, in part, replaced by hydrogen atoms or glycidyl groups, and M is an alkali metal and/or alkaline earth metal.

Each of a and b is an integer of 0 to 100, and each of c and d is an integer of 0 to 20.

In a third aspect, the present invention provides a flame retardant resin composition comprising 100 parts by weight of a polycarbonate resin, 0.01 to 3.0 parts by weight of an alkali metal or alkaline earth metal salt of sulfonic acid of polyphenylene ether oligomer having the structural formula (1), and optionally, 5 to 40 parts by weight of a rubber-modified styrene/(meth)acrylonitrile graft copolymer obtained by polymerizing at least a styrenic monomer and (meth)acrylonitrile in the presence of rubber.

Also provided is a molded article obtained by molding the flame retardant resin composition.

The novel polyphenylene ether oligomer sulfonic acid salt is useful as a modifier for thermoplastic resins and may also serve as a flame retardant, compatibilizing agent, antistatic agent or the like. The method of the invention ensures the easy and effective preparation of the oligomer sulfonic acid salt.

The resin composition comprising a polycarbonate resin and a polyphenylene ether oligomer sulfonic acid salt as defined herein eliminates the use of halogen- and phosphorus-based flame retardants causing environmental pollution or performance deterioration, clears a rigorous flame retardance level comparable to the use of such flame retardants, and is improved in mechanical strength, outer appearance and thermal stability. In particular, the resin composition further comprising a styrene resin is improved in impact strength, weld strength, mold deposit prevention and outer appearance, and thus suited for use in many applications, especially electric and electronic components, business machine components and precision components.

DESCRIPTION OF THE PREFERRED EMBODIMENTS

The alkali metal or alkaline earth metal salt of sulfonic acid of polyphenylene ether oligomer according to the present invention has the structural formula (1).

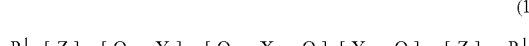

Herein —[O—X—O]— has the structural formula (2):

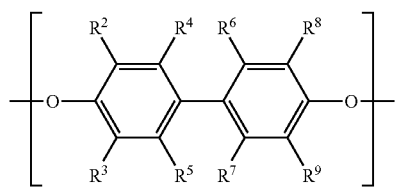

wherein each of $R^2$, $R^3$, $R^4$, $R^8$ and $R^9$ which may be the same or different is a halogen atom, an alkyl group of up to 6 carbon atoms or a phenyl group, each of $R^5$, $R^6$ and $R^7$ which may be the same or different is a hydrogen atom, a halogen atom, an alkyl group of up to 6 carbon atoms or a phenyl group.

—[Y—O]— is a structure of one type having the structural formula (3) or a random array of structures of at least two types having the structural formula (3):

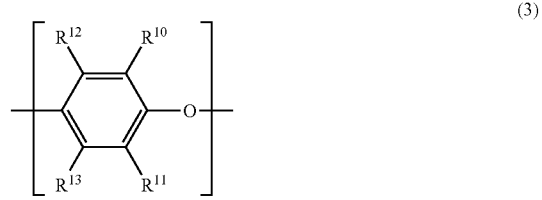

wherein each of $R^{10}$ and $R^{11}$ which may be the same or different is a halogen atom, an alkyl group of up to 6 carbon atoms or a phenyl group, each of $R^{12}$ and $R^{13}$ which may be the same or different is a hydrogen atom, a halogen atom, an alkyl group of up to 6 carbon atoms or a phenyl group.

Z is a divalent organic group of 1 to 6 carbon atoms which may contain an oxygen atom.

$R^1$ essentially contains a structure having the structural formula (4):

and $R^1$ may be, in part, replaced by hydrogen atoms or glycidyl groups. M is an alkali metal and/or alkaline earth metal.

Each of a and b is an integer of 0 to 100, and each of c and d is an integer of 0 to 20.

Of the groups of $R^2$ to $R^{13}$, suitable halogen atoms include chlorine, bromine and fluorine; and suitable alkyl groups of up to 6 carbon atoms include methyl, ethyl, propyl, butyl, and cyclohexyl. It is preferred that in —[O—X—O]— in structural formula (2), $R^2$, $R^3$, $R^4$, $R^8$ and $R^9$ are alkyl groups of up to 3 carbon atoms, $R^5$, $R^6$ and $R^7$ are hydrogen atoms or alkyl groups of up to 3 carbon atoms, and in —[Y—O]— in formula (3), $R^{10}$ and $R^{11}$ are alkyl groups of up to 3 carbon atoms, and $R^{12}$ and $R^{13}$ are hydrogen atoms or alkyl groups of up to 3 carbon atoms.

Most preferred are alkali metal or alkaline earth metal salts of sulfonic acid of polyphenylene ether oligomer in which the structural formula (2) includes —[O—X—O]— wherein $R^2$, $R^3$, $R^4$, $R^7$, $R^8$ and $R^9$ are methyl groups and $R^5$ and $R^6$ are hydrogen atoms, that is, having the structural formula (5); and the structural formula (3) includes —[Y—O]— wherein $R^{10}$ and $R^{11}$ are methyl groups, $R^{12}$ is a hydrogen atom or methyl group, and $R^{13}$ is a hydrogen atom, that is, possessing a structure having the structural formula (6) or (7) or a random array of structures having the structural formulae (6) and (7).

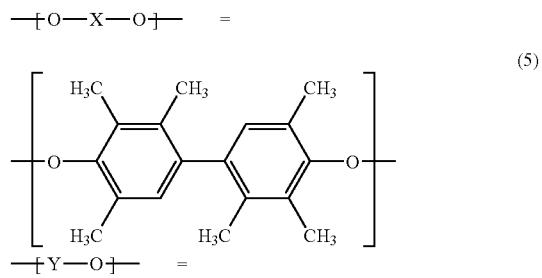

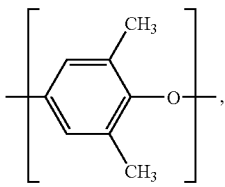

(6)

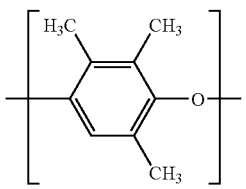

(7)

—[Z]— is a divalent organic group of 1 to 6 carbon atoms which may contain an oxygen atom, examples of which include alkylene groups such as methylene, ethylene, propylene, butylene and hexylene. The alkylene group may be separated by —O— or have —O— bonded at its end on the $R^1$ side.

It is noted that 50 to 100 mol %, preferably 80 to 100 mol % of $R^1$ are groups of structural formula (4), and the remainder are hydrogen atoms or glycidyl groups. M is an alkali metal such as sodium or potassium or alkaline earth metal such as magnesium, calcium or barium, with sodium and/or potassium being preferred. With respect to a, b, c and d, it is preferred that a+b be equal to 0 to 50, especially 0 to 10, and c and d each be equal to 0 to 10, especially 0.

The method for preparing the polyphenylene ether oligomer sulfonic acid salt of the invention starts with an epoxy-terminated polyphenylene ether oligomer having the structural formula (8). This difunctional polyphenylene ether oligomer having epoxy groups at opposite ends as represented by the structural formula (8), sometimes abbreviated as "OPE-2Gly," hereinafter, is obtained by subjecting a difunctional polyphenylene ether oligomer having the structural formula (9) or (10), sometimes abbreviated as "difunctional OPE," hereinafter, to dehydrohalogenation reaction in the presence of a glycidyl halide (e.g., epichlorohydrin) and a base.

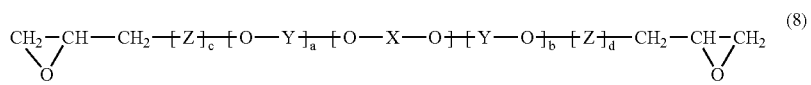

(8)

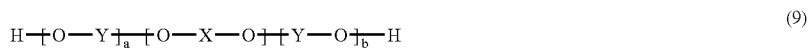

(9)

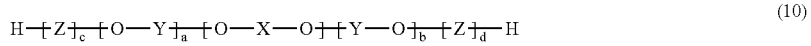

(10)

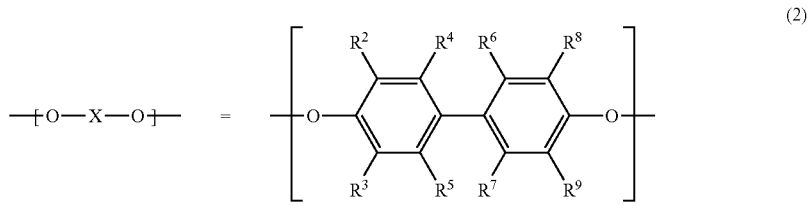

(2)

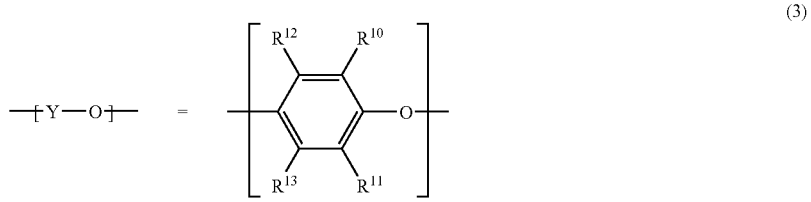

(3)

Herein, a, b, c, d, Z, and $R^2$ to $R^{13}$ are as defined above.

The difunctional OPE used herein is not particularly limited as long as it has a structure of structural formula (9) or (10) above. The difunctional OPE having structural formula (9) may be obtained, for example, by copolymerizing a dihydric phenol and a monohydric phenol in the presence of an amine as described in JP-A 2003-12796.

Described below is the method of preparing a difunctional OPE having structural formula (10) wherein —[Z]— is —$(CH_2)_mO$— or —$(CH_2CHR^{14}O)$—, for example. In the event —$(CH_2)_mO$— is to be introduced, a difunctional OPE having structural formula (9) and a halogenated alcohol having the structural formula (11) below may be reacted in a suitable solvent such as alcohol, ether or ketone and in the presence of an alkali metal salt such as potassium hydroxide, potassium carbonate or sodium ethoxide. In the event —$(CH_2CHR^{14}O)$— is to be introduced, for example, by the method described in JP-B SHO 52-4547, a difunctional OPE having structural formula (9) and an alkylene oxide having the structural formula (12) below may be reacted in an aromatic solvent such as toluene or xylene and in the presence of an alkali catalyst such as potassium hydroxide, sodium ethoxide or triethylamine.

$$Q—(CH_2)_m—OH \quad (11)$$

Herein Q is chlorine, bromine or iodine, and m is an integer of 2 to 6.

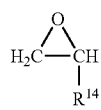

(12)

Herein $R^{14}$ is hydrogen, methyl or ethyl.

In preparing the intermediate, OPE-2Gly, the difunctional OPE having structural formula (9) or (10) is used either in the form of a powder separated from the reaction solution or in the form as dissolved in the reaction solution.

While the glycidyl halide used for glycidyl formation is not particularly limited, epichlorohydrin or epibromohydrin is preferred for availability. The amount of the glycidyl halide used is preferably 1 to 100 moles, more preferably 5 to 60 moles per mole of the difunctional OPE having structural formula (9) or (10).

Suitable bases include sodium hydroxide, potassium hydroxide, sodium methoxide, sodium ethoxide, calcium hydroxide, sodium carbonate, potassium carbonate, and sodium bicarbonate. An appropriate amount of the base used is 0.1 to 10 moles, more preferably 1 to 4 moles per mole of the difunctional OPE having structural formula (9) or (10).

For the dehydrohalogenation, a reaction temperature in the range of –10° C. to 120° C. is preferred.

At the end of reaction, the reaction solution is washed with water to remove the by-product salt and distilled in vacuum to remove the excess glycidyl halide. In this way, OPE-2Gly is obtained in solid form.

By converting the epoxy groups at opposite ends of the OPE-2Gly thus obtained into sulfonic acid alkali metal or alkaline earth metal salts, the sulfonic acid alkali metal or alkaline earth metal salt of polyphenylene ether oligomer can be prepared. The reagent for converting an epoxy group into a sulfonic acid alkali metal or alkaline earth metal salt is preferably selected from sodium hydrogen sulfite, potassium hydrogen sulfite, sodium disulfite, and potassium disulfite. The molar ratio of sulfur atoms in the sulfonic acid alkali metal or alkaline earth metal salt-forming reagent to epoxy groups, "S/epoxy," is preferably at least 1.0, more preferably in the range of 1.0 to 1.2.

This preparation is preferably carried out in an organic solvent. The organic solvent used herein is not particularly limited as long as the intermediate, OPE-2Gly can be dissolved or dispersed therein. Organic polar solvents are preferred for the solubility of OPE-2Gly, ease of progress of sulfonic acid alkali metal or alkaline earth metal salt-forming reaction, and the dispersibility of the product, sulfonic acid alkali metal or alkaline earth metal salt of polyphenylene ether oligomer. Suitable solvents include ketone solvents such as acetone, methyl ethyl ketone and methyl isobutyl ketone, ester solvents such as ethyl acetate, isobutyl acetate, and propylene glycol monomethyl ether acetate, ether solvents such as dioxane and tetrahydrofuran, and alcohol solvents such as propylene glycol monomethyl ether and diacetone alcohol.

Further, this preparation is preferably carried out in the presence of water for dissolving the sulfonic acid alkali metal or alkaline earth metal salt-forming reagent and enhancing reactivity. Particularly when sodium disulfite or potassium disulfite is used as the sulfonic acid alkali metal or alkaline earth metal salt-forming reagent, the use of water is essential to convert the reagent into sodium hydrogen sulfite or potassium hydrogen sulfite. Optionally, a catalytic amount of sodium sulfite or potassium sulfite may be additionally used in order to enhance reaction efficiency.

One exemplary preparation formulation used in practice is a method involving dissolving the intermediate OPE-2Gly in an organic polar solvent, adding dropwise a predetermined amount of the sulfonic acid alkali metal or alkaline earth metal salt-forming reagent and an aqueous solution of the catalyst thereto, and continuing the reaction for a predetermined time. The temperature in the addition and reaction steps may range from room temperature to the reflux temperature. Heated conditions at 50° C. or higher, especially reflux conditions are preferred for smooth progress of the reaction. No particular limit is imposed on the reaction time as well. By continuing the reaction for 1 to 20 hours, more preferably for 2 to 8 hours under the reflux conditions, the epoxy groups can be converted into sulfonic acid alkali metal or alkaline earth metal salts.

As the reaction proceeds, the product, sulfonic acid alkali metal or alkaline earth metal salt of polyphenylene ether oligomer is insolubilized whereupon particulates precipitate and the reaction solution becomes suspended. At the end of reaction, the water and organic polar solvent are distilled off from the reaction solution, leaving a crude product which may be finished as such. A product with a higher purity can be obtained by washing the crude product with water to remove any residual sulfonic acid alkali metal or alkaline earth metal salt-forming reagent or by washing the crude product with an organic solvent to dissolve away the unreacted intermediate oligomer. When this product is used as an additive to any organic resin, it is preferably finished by removing the residual water and organic solvent through vacuum drying and comminuting into a fine powder.

The sulfonic acid salt of polyphenylene ether oligomer of the present invention, sometimes referred to as the inventive salt, hereinafter, is useful as a modifier for many thermoplastic resins, for example, polycarbonate resins, polystyrene resins, acrylonitrile-butadiene-styrene (ABS) resins, polyphenylene ether resins, polyester resins, polyamide resins, polyethylene, polypropylene, polybutene, polysulfone, polyvinyl acetate, ethylene-vinyl acetate copolymers, poly(methyl methacrylate), polyoxyethylene, cellulose acetate, and cellulose nitrate. The inventive salt can be used as a flame retardant, compatibilizing agent, antistatic agent or the like.

The method of adding the inventive salt to a thermoplastic resin as a modifier is not particularly limited, and any prior art well-known methods may be used. Exemplary methods include mixing the inventive salt with a thermoplastic resin in powder form; kneading the inventive salt with a molten thermoplastic resin (melt kneading method); and dissolving a thermoplastic resin in a solvent, dispersing the inventive salt in the solution and optionally removing the solvent. In general, a modified thermoplastic resin is obtained by compounding a thermoplastic resin with the inventive salt and an optional additive(s), melting and kneading the mixture.

In the compounding and kneading steps, an apparatus and method known for prior art rubbers and plastics may be employed. The desired resin composition can be prepared using a suitable mixer, for example, a ribbon blender, Henschel mixer, Banbury mixer, drum tumbler, single screw extruder, twin screw extruder, co-kneader, multi-screw extruder or the like. The thermoplastic resin composition thus obtained may be formed into various molded parts, such as molded parts in the electric appliance field, by any well-known molding techniques, for example, injection molding, hollow casting, extrusion molding, compression molding, vacuum forming, calendering and rotary molding.

Particularly when compounded in a polycarbonate resin, the sulfonic acid salt of polyphenylene ether oligomer having formula (1) of the present invention is effective for imparting not only flame retardance, but also mechanical strength, transparency and thermal stability. When compounded in a resin composition comprising a polycarbonate resin and a styrene resin, the inventive salt forms a flame retardant resin composition having improved impact strength, weld strength, mold deposit prevention and outer appearance.

Now the flame retardant resin composition of the invention is described in detail. The flame retardant resin composition is defined as comprising (A) an alkali metal or alkaline earth metal salt of sulfonic acid of polyphenylene ether oligomer having the structural formula (1) and (B) a polycarbonate resin as essential components, and optionally, (C) a styrene resin and (D) a silicone compound flame retardant.

Component (A) is as just described above. An appropriate amount of the sulfonic acid salt of polyphenylene ether oligomer (A) compounded is 0.01 to 3.0 parts, preferably 0.05 to 2.0 parts, more preferably 0.08 to 1.5 parts by weight per 100 parts by weight of the polycarbonate resin. On this basis, less than 0.01 pbw of the sulfonic acid salt of PPE oligomer is too small to impart sufficient flame retardance whereas more than 3.0 pbw leads to a likelihood of thermal decomposition, detracting from flame retardance and transparency.

Component (B) is a polycarbonate resin. It may be a homopolymer or copolymer of optionally branched thermoplastic aromatic polycarbonate which is prepared by reacting an aromatic dihydroxy compound or a mixture of an aromatic dihydroxy compound and a minor proportion of a polyhydroxy compound with phosgene or a carbonic acid diester. The polymerization methods which can be used for preparing aromatic polycarbonate resins include interfacial polycondensation (phosgene method) and melt polymerization (transesterification method).

One reactant, aromatic dihydroxy compound may be selected from among 2,2-bis(4-hydroxyphenyl)propane (known as bisphenol A), tetramethylbisphenol A, bis(4-hydroxyphenyl)-p-diisopropylbenzene, hydroquinone, resorcinol and 4,4'-dihydroxydiphenyl, and mixtures thereof, with bisphenol A being preferred. Branched aromatic polycarbonate resins may be prepared using a branching compound along with the foregoing aromatic dihydroxy compound. Suitable branching compounds includes polyhydroxy compounds such as phloroglucinol, 4,6-dimethyl-2,4,6-tris(4-hydroxyphenyl)-2-heptene, 4,6-dimethyl-2,4,6-tris(4-hydroxyphenyl)heptane, 2,6-dimethyl-2,4,6-tris(4-hydroxyphenyl)-3-heptene, 1,3,5-tris(4-hydroxyphenyl)benzene and 1,1,1-tris(4-hydroxyphenyl)ethane, as well as 3,3-bis(4-hydroxyaryl)oxyindole (or isatin bisphenol), 5-chloroisatin bisphenol, 5,7-dichloroisatin bisphenol and 5-bromoisatin bisphenol. The amount of the branching compound used is 0.01 to 10 mol %, preferably 0.1 to 2 mol % based on the total of aromatic dihydroxy compound and branching compound.

The molecular weight of the polycarbonate resin can be adjusted by feeding an aqueous solution of an aromatic dihydroxy compound and a monohydric aromatic hydroxy compound as an endcapping agent, and a carbonyl halide at a certain weight ratio to an organic solvent during preparation of the polycarbonate resin, that is, in the presence of a polymerization catalyst. Suitable monohydric aromatic hydroxy compounds used as the endcapping agent include m- or p-methylphenol, m- or p-propylphenol, p-tert-butylphenol, and long chain alkyl-substituted phenols.

Suitable polycarbonate resins include polycarbonate resins derived from 2,2-bis(4-hydroxyphenyl)propane and polycarbonate copolymers derived from 2,2-bis(4-hydroxy-phenyl) propane and another aromatic dihydroxy compound. The polycarbonate resin may be a polymer having a siloxane structure as well, for example, obtained by copolymerizing an oligomer having a siloxane structure for the purpose of enhancing flame retardance. The polycarbonate resin has a molecular weight of 15,000 to 40,000, more preferably 16,000 to 30,000, as expressed by a viscosity average molecular weight calculated from a viscosity of a solution in methylene chloride measured at temperature 25° C.

Component (C) is a styrene resin which is a rubber-modified styrene/(meth)acrylonitrile graft copolymer obtained by polymerizing at least a styrenic monomer and (meth)acrylonitrile in the presence of rubber. In the present disclosure, this copolymer is sometimes referred to as "rubber-modified styrene/(meth)acrylonitrile copolymer." During the preparation of "rubber-modified styrene/(meth)acrylonitrile copolymer," another copolymerizable monomer may be used along with the main reactants, styrenic monomer and (meth)acrylonitrile and copolymerized therewith.

Examples of the styrenic monomer, one reactant for component (C) include styrene, α-methylstyrene and p-methylstyrene, with styrene being most preferred. The (meth)acrylonitrile is acrylonitrile or methacrylonitrile. Examples of the other copolymerizable monomer include alkyl (meth)acrylates such as methyl acrylate, ethyl acrylate, propyl acrylate, methyl methacrylate, and ethyl methacrylate; maleimide and N-phenylmaleimide, with the alkyl (meth)acrylates being preferred. As used herein, the term "(meth)acrylonitrile" means acrylonitrile and/or methacrylonitrile and the term "(meth)acrylate" means acrylate and/or methacrylate.

The rubber which is copresent during polymerization is preferably a rubber having a glass transition temperature of 10° C. or lower. Exemplary such rubbers include diene rubbers, acrylic rubbers, ethylene/propylene rubbers and silicone rubbers, with the diene rubbers and acrylic rubbers being preferred.

Examples of suitable diene rubbers include polybutadiene, butadiene/styrene copolymers, polyisoprene, butadiene/lower alkyl (meth)acrylate copolymers, and butadiene/styrene/lower alkyl (meth)acrylate copolymers. Exemplary of the lower alkyl (meth)acrylate are methyl acrylate, ethyl acrylate, methyl methacrylate and ethyl methacrylate. In the butadiene/lower alkyl (meth)acrylate copolymers and butadiene/styrene/lower alkyl (meth)acrylate copolymers, the proportion of lower alkyl (meth)acrylate is preferably up to 30% by weight of the weight of rubber.

Examples of suitable acrylic rubbers include synthetic rubbers from alkyl acrylates. The alkyl group of the alkyl acrylate preferably has 1 to 8 carbon atoms. Examples of alkyl acrylates include ethyl acrylate, butyl acrylate and ethylhexyl acrylate. In the alkyl acrylate rubber, a crosslinkable ethylenically unsaturated monomer may be used if desired. Suitable crosslinking monomers include alkylene diols, di(meth) acrylates, polyester di(meth)acrylate, divinylbenzene, trivinylbenzene, triallyl cyanurate, allyl (meth)acrylate, butadiene, and isoprene. Another example of the acrylic rubber is a core-shell type polymer having a crosslinked diene rubber as the core.

In the rubber-modified styrene/(meth)acrylonitrile copolymer (C), it is preferred that the content of styrenic monomer be 10 to 90% by weight, more preferably 25 to 85% by weight, the content of (meth)acrylonitrile be 5 to 40% by weight, more preferably 5 to 25% by weight, and the content of rubber be 5 to 80% by weight, more preferably 10 to 50% by weight. The content of other copolymerizable monomer is preferably up to 20% by weight, more preferably up to 10% by weight of the copolymer.

The method of graft polymerizing the styrenic monomer and the (meth)acrylonitrile monomer in the presence of rubber is not particularly limited. An emulsion polymerization or bulk polymerization technique is generally employed. The copolymer which can be used as component (C) may be prepared by any desired technique.

The rubber-modified styrene/(meth)acrylonitrile copolymer (C) is generally a mixture of a graft copolymer having a copolymer of at least styrene and (meth)acrylonitrile monomers grafted to rubber and a copolymer resulting from copolymerization of the monomers alone. Typical examples of the rubber-modified styrene/(meth)acrylonitrile copolymer are ABS resins, AES resins and AAS resins.

In the inventive composition, the content of component (C) is 5 to 40 parts by weight per 100 parts by weight of component (B), i.e., polycarbonate resin. On this basis, a resin composition with less than 5 pbw of component (C) is likely to lose fluidity whereas a resin composition with more than 40 pbw of component (C) is likely to lose heat resistance. The content of component (C) is preferably 6 to 35 parts, more preferably 10 to 30 parts by weight per 100 parts by weight of the polycarbonate resin.

The flame retardant polycarbonate resin composition of the invention can be further improved in flame retardance sometimes when (D) a flame retardant in the form of a silicone compound is compounded therein. This is probably because the silicone compound crosslinks to form a flame retardant layer during combustion. Any of prior art well-known silicone compounds may be added.

The preferred silicone compounds is an organopolysiloxane having a phenyl group bonded to a silicon atom in a molecule, represented by the average compositional formula (13), though not limited thereto.

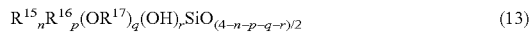

$$R^{15}{}_n R^{16}{}_p (OR^{17})_q (OH)_r SiO_{(4-n-p-q-r)/2} \quad (13)$$

Herein $R^{15}$ is phenyl, $R^{16}$ is hydrogen or a monovalent $C_1$-$C_6$ hydrocarbon group excluding phenyl, $R^{17}$ is a monovalent $C_1$-$C_4$ hydrocarbon group, n, p, q and r are numbers in the range: $0.1 \leq n \leq 2.0$, $0.2 \leq p \leq 2.5$, $0 \leq q \leq 1.5$, $0 \leq r \leq 0.35$, and $0.9 \leq n+p+q+r \leq 2.8$.

From the standpoints of its dispersion in the polycarbonate resin and its flame retardant effect, this organopolysiloxane should have a phenyl group bonded to a silicon atom in a molecule. In addition, n, representative of the moles of phenyl groups ($R^{15}$) substituted per mole of silicon atoms, should preferably fall in the range of $0.1 \leq n \leq 2.0$, and more preferably $0.15 \leq n \leq 1.4$, in order to impart these characteristics.

$R^{16}$ is hydrogen or a monovalent $C_1$-$C_6$ hydrocarbon group excluding phenyl. The incorporation of an appropriate amount of this substituent group alleviates the steric hindrance of an organopolysiloxane containing bulky phenyl groups and increases the degree of spatial freedom, allowing phenyl groups to overlap each other to enhance the flame retardant effect. When $R^{16}$ is hydrogen, a flame retardant effect due to reactive Si—H groups is also expectable. Preferred examples of $R^{16}$ include hydrogen, $C_1$-$C_6$ alkyl groups such as methyl, ethyl, propyl, butyl and hexyl, and $C_2$-$C_6$ alkenyl groups such as vinyl, allyl and butenyl. Among others, hydrogen, methyl and vinyl are more preferred for the steric hindrance-alleviating effect and from the industrial aspect. To achieve these effects, the value of p in formula (13), representative of the content of $R^{16}$, should preferably fall in the range of $0.2 \leq p \leq 2.5$, and more preferably $0.5 \leq p \leq 2.1$.

When alkoxy groups are incorporated in the organopolysiloxane, these alkoxy groups undergo oxidative decomposition and crosslinking during combustion whereby the organopolysiloxane is united to the polycarbonate resin to form a flame retardant layer at the burnt portion, preventing flaming drips from dropping. $R^{17}$ forming an alkoxy group in formula (13) is a monovalent $C_1$-$C_4$ hydrocarbon group, such as methyl, ethyl, propyl, isopropyl, butyl and isobutyl, with methyl being preferred from the industrial aspect too. Alkyl groups of 5 or more carbon atoms form less reactive alkoxy groups, suggesting that the flame retardant effect due to the incorporation of alkoxy groups is not expectable. The incorporation of too many alkoxy groups leads to an organopolysiloxane with a lower molecular weight, which will volatilize off by heat during combustion prior to the crosslinking reaction, resulting in an increased loss on burning. Therefore, the value of q in formula (13), representative of the content of alkoxy groups, should preferably be equal to or less than 1.5, more preferably equal to or less than 1.2. The lower limit of q is more preferably equal to or more than 0.05, and especially equal to or more than 0.1.

With respect to silanol groups contained in the organopolysiloxane, some silanol groups can be left from the preparation process, but they are least reactive and contribute little to flame retardance. From the standpoints of storage stability, and stability and moldability during melt processing together with the polycarbonate resin, the value of r in formula (13), representative of the content of silanol groups, should preferably be equal to or less than 0.35, more preferably equal to or less than 0.3, and most preferably equal to 0.

The phenyl-containing organopolysiloxane used herein may have any desired composition and structure as long as it meets the above-defined requirements. A mixture of two or more organopolysiloxanes having different compositions or structures may be used. Preferred are an organopolysiloxane having phenyl and methyl groups bonded to silicon atoms in a molecule and further having a branched structure; an organopolysiloxane having monovalent hydrocarbon groups (e.g., phenyl, methyl, vinyl) and $C_1$-$C_4$ alkoxy groups bonded to silicon atoms in a molecule; and an organopolysiloxane having phenyl and methyl groups bonded to silicon atoms and Si—H groups in a molecule, with an Si—H content of 0.1 to 1.2 mol/100 g.

As used herein, the term "branched structure" means that the organopolysiloxane contains tri- and/or tetra-functional siloxane units in its structure, and the term "Si—H content" corresponds to the moles of Si—H groups per 100 g of the organopolysiloxane, which can be determined by measuring the volume of hydrogen gas evolving from the Qrganopolysiloxane by the alkali fusion method per unit weight of the organopolysiloxane. For example, if 122 ml (at 25° C.) of hydrogen gas evolves per gram of an organopolysiloxane, the Si—H content is computed to be 0.5 mol/100 g according to the following equation.

$$122\times273/(273+25)+22400\times100\approx0.5$$

The molecular weight of the phenyl-containing organopolysiloxane is not particularly limited. Since an organopolysiloxane with too high or too low a molecular weight is less dispersible in the polycarbonate resin and less effective for imparting flame retardance, the subscripts in formula (13) should preferably fall in the range $0.9 \leq n+p+q+r \leq 2.8$, and more preferably $1.1 \leq n+p+q+r \leq 2.6$. Differently stated, the phenyl-containing organopolysiloxane should preferably have a weight average molecular weight of 410 to 50,000, and more preferably 600 to 15,000, as measured by gel permeation chromatography (GPC) versus polystyrene standards.

The organopolysiloxane containing silicon-bonded phenyl groups in a molecule can be prepared by prior art well-known methods. For example, a desired organopolysiloxane may be prepared by co-hydrolyzing organochlorosilanes corresponding to the end product optionally in the presence of a $C_1$-$C_4$ alcohol and removing the side-products, hydrochloric acid and low-boiling fractions. In case the starting reactant is an alkoxysilane, silicone oil or cyclic siloxane having organic residues (e.g., phenyl, methyl, vinyl) and Si—H bonds in a molecule, a desired organopolysiloxane may be prepared by carrying out polymerization reaction in the presence of an acid catalyst such as hydrochloric acid, sulfuric acid or methanesulfonic acid, optionally with water added for hydrolysis, and removing the acid catalyst used and low-boiling fractions likewise.

Some molded articles obtained by molding the flame retardant polycarbonate resin composition of the invention do not need transparency. In such a case, an organopolysiloxane containing methyl groups as the silicon-bonded substituent group and Si—H groups in a molecule, free of aromatic hydrocarbon groups, and having a Si—H content of 0.1 to 1.6 mol/100 g as described in JP-A 2003-253109 and JP-A 2003-253110 may be compounded as the additional flame retardant.

In the embodiment wherein the additional flame retardant in the form of silicone compound (D) is compounded, it is preferably added in an amount of 0.01 to 5.0 parts, more preferably 0.1 to 3.0 parts by weight per 100 parts by weight of the polycarbonate resin. Less then 0.01 pbw of the silicone compound is insufficient to achieve a dispersion-improving effect whereas more than 5.0 pbw achieves no further improvement in flame retardance and adversely affects the outer appearance and strength of molded articles.

To the flame retardant resin composition of the invention, other ingredients may be added if necessary. Suitable other ingredients include additives such as polyfluoroethylene resins having a fibrillating ability, flame retardants other than components (A) and (D) (with the proviso that halogen- and phosphorus-based flame retardants should preferably be avoided), other thermoplastic resins, elastomers, UV-absorbers, phenolic antioxidants, phosphorus-based thermal stabilizers, pigments, dyes, lubricants, mold release agents, plasticizers, antistatic agents, and slipping agents; reinforcements such as glass fibers, glass flakes, carbon fibers and metal fibers; whiskers such as potassium titanate, aluminum borate and calcium silicate; and inorganic fillers such as mica, talc, and clay. They may be added by any prior art well-known technique capable of taking advantage of a particular ingredient.

The flame retardant resin composition of the invention is prepared by mixing the alkali metal or alkaline earth metal salt of sulfonic acid of PPE oligomer (A) and the polycarbonate resin (B), and optionally, the styrene resin (C), the silicone compound (D) and the like. In one typical method of preparing the flame retardant resin composition of the invention, the above components are kneaded on any desired mixer, for example, a single screw or multi-screw kneader, Banbury mixer, roll mill or Brabender Plastograph, followed by cooling and solidifying. An alternative solution mixing method involves adding the above components to a suitable solvent such as hydrocarbons or derivatives thereof (e.g., hexane, heptane, benzene, toluene, and xylene) and mixing dissolvable components together or dissolvable components and undissolvable components in a suspension state. A melt kneading method is recommended from the standpoint of an industrial expense, though the invention is not limited thereto. For the melt kneading, a single or twin screw extruder is preferably used.

EXAMPLE

Synthesis Examples and Examples are given below for illustrating the present invention and not by way of limitation. It is noted that the synthesized compounds were analyzed and identified by the methods shown below.

(1) The structure of difunctional OPE and OPE-2Gly was identified by $^1$H-NMR, $^{13}$C-NMR, and IR analysis.

(2) The number average molecular weight and weight average molecular weight of difunctional OPE and OPE-2Gly were determined by gel permeation chromatography (GPC). Using a GPC curve of a sample and a molecular weight calibration curve, data processing was performed. The molecular weight calibration curve was obtained by approximating the relationship of the molecular weight of standard polystyrene to elution time to the following equation:

$$\operatorname{Log} M = A_0 X^3 + A_1 X^2 + A_2 X + A_3 + A_4 / X^2$$

wherein M is a molecular weight, X is an elution time minus 19 (minutes), and each of $A_0$ to $A_4$ is a coefficient.

(3) The hydroxyl equivalent of difunctional OPE was determined by using 2,6-dimethylphenol as a standard, dissolving a sample in dry dichloromethane, performing IR spectroscopy (liquid cell technique, cell length 1 mm), and measuring an absorption intensity at 3,600 $cm^{-1}$.

(4) An IR analysis of OPE-2Gly revealed that the peak (3,600 $cm^{-1}$) assigned to phenolic hydroxyl group on the difunctional OPE used as the starting reactant had disappeared, confirming that phenolic hydroxyl groups had been converted to glycidyl.

(5) An alkali metal salt of sulfonic acid of polyphenylene ether oligomer obtained in Example was decomposed with nitric acid and analyzed by ICP-AES, in which the contents of S and Na or K elements were measured by the absolute calibration technique.

Synthesis Example 1

Synthesis of Difunctional OPE (A)

A 20-L volume elongated reactor equipped with a stirrer, thermometer, air inlet tube and baffles was charged with 13 g of copper (I) chloride, 795 g of di-n-butylamine and 6,000 g of toluene. The contents were stirred at a reaction temperature of 40° C. With stirring, a mixed solution of 418 g of 2,2',3,3', 5,5'-hexamethyl-(1,1'-biphenyl)-4,4'-diol and 915 g of 2,6-dimethylphenol in 6,000 g of methanol (molar ratio of dihydric phenol to monohydric phenol was 1:5) was added dropwise to the reactor over 150 minutes while bubbling air at 2 L/min. An aqueous solution of disodium dihydrogen ethylenediaminetetraacetate was added to the reaction solution to terminate the reaction. Thereafter, the reaction solution was washed with 1N hydrochloric acid and then deionized water. The solution was concentrated on an evaporator, obtaining 2,560 g of a 50 wt % toluene solution of difunctional OPE (A). The difunctional OPE (A) thus obtained was analyzed by GPC, finding a number average molecular weight of 980 and a weight average molecular weight of 1,510. It had a hydroxyl equivalent of 490 g/mol.

Synthesis Example 2

Synthesis of OPE-2Gly (A)

A 5-L volume reactor equipped with a stirrer, thermometer and dropping funnel was heated at 100° C. and charged with 800 g of the 50 wt % toluene solution of difunctional OPE (A) obtained above and 2,100 g of epichlorohydrin. Thereafter, 201 g of a 23 wt % ethanol solution of sodium ethoxide was added dropwise over one hour from the dropping funnel. The dropwise addition was followed by 5 hours of stirring. The reaction mixture was washed with deionized water, after which the organic layer was separated. The toluene and excess epichlorohydrin were distilled off from the solution. The remainder was vacuum dried, leaving 430 g of OPE-2Gly (A). The OPE-2Gly (A) thus obtained was analyzed by GPC, finding a number average molecular weight of 1,040 and a weight average molecular weight of 1,650. It had an epoxy equivalent of 515 g/mol.

Example 1

Synthesis of Sodium Salt of Sulfonic Acid of Polyphenylene Ether Oligomer (A)

A 1-L volume flask equipped with a stirrer, cooling condenser, thermometer and dropping funnel was charged with 206 g of the OPE-2Gly (A) obtained above and 481 g of methyl isobutyl ketone. By stirring for one hour at room temperature, the oligomer was dissolved to form a uniform solution. The flask was heated to an internal temperature of 80-90° C., after which an aqueous solution containing 43.7 g of sodium hydrogen sulfite, 2.5 g of sodium sulfite and 115.5 g of deionized water was added dropwise over one hour. The reaction mixture was stirred for 5 hours under reflux.

The reaction mixture was heated in an oil bath at 130° C. to distill off the water and methyl isobutyl ketone substantially. It was cooled to room temperature, after which 400 g of methyl isobutyl ketone was added again. The mixture was stirred for one hour at room temperature to form a uniform dispersion, which was filtered to remove the unreacted OPE-2Gly (A) dissolved in methyl isobutyl ketone. The cake-like residue not dissolvable in methyl isobutyl ketone was washed with acetone and then added to 500 g of deionized water. The mixture was stirred for one hour at room temperature to form a uniform dispersion, which was filtered to remove the remaining sodium hydrogen sulfite and sodium sulfite in aqueous solution form. The resulting cake-like material was washed with acetone and then dried in a vacuum of 10 mmHg and at a temperature of 80° C. for 6 hours to remove the residual acetone and water. The material was ground in a mortar, obtaining 210 g of a yellowish white fine powder.

The thus obtained sodium salt of sulfonic acid of polyphenylene ether oligomer (A) had the structure of formula (1) wherein $R^2$, $R^3$, $R^4$, $R^7$, $R^8$, $R^9$, $R^{10}$ and $R^{11}$ are methyl, $R^5$, $R^6$, $R^{12}$ and $R^{13}$ are hydrogen, M is sodium, a+b=6, c=0, and d=0. The salt was analyzed by nitric acid decomposition/ICP-AES method, finding an S content of 4.9 wt % (theory 5.2 wt %) and an Na content of 3.6 wt % (theory 3.7 wt %).

Example 2

Synthesis of Potassium Salt of Sulfonic Acid of Polyphenylene Ether Oligomer (A)

A 1-L volume flask equipped with a stirrer, cooling condenser, thermometer and dropping funnel was charged with 204 g of the OPE-2Gly (A) obtained above and 476 g of propylene glycol monomethyl ether. By stirring for one hour at 80° C., the oligomer was dissolved to form a uniform solution. While the flask was heated to an internal temperature of 80-90° C., an aqueous solution containing 46.7 g of potassium disulfite, 3.2 g of potassium sulfite and 138 g of deionized water was added dropwise over one hour. The reaction mixture was stirred for 5 hours under reflux.

The reaction mixture was heated in an oil bath at 140° C. to distill off the water and propylene glycol monomethyl ether substantially. It was cooled to room temperature, after which 400 g of propylene glycol monomethyl ether was added again. The mixture was stirred for one hour at 60° C. to form a uniform dispersion, which was filtered to remove the unreacted OPE-2Gly (A) dissolved in propylene glycol monomethyl ether. The cake-like residue not dissolvable in propylene glycol monomethyl ether was washed with acetone and then added to 600 g of deionized water. The mixture was stirred for one hour at room temperature to form a uniform dispersion, which was filtered to remove the remaining potassium disulfite and potassium sulfite in aqueous solution form. The resulting cake-like material was washed with acetone and then dried in a vacuum of 10 mmHg and at a temperature of 80° C. for 6 hours to remove the residual acetone and water. The material was ground in a mortar, obtaining 216 g of a yellowish white fine powder.

The thus obtained potassium salt of sulfonic acid of polyphenylene ether oligomer (A) had the structure of formula (1) wherein $R^2$, $R^3 R^4$, $R^7$, $R^8$, $R^9$, $R^{10}$ and $R^{11}$ are methyl, $R^5$, $R^6$, $R^{12}$ and $R^{13}$ are hydrogen, M is potassium, a+b=6, c=0, and d=0. The salt was analyzed by nitric acid decomposition/ICP-AES method, finding an S content of 4.7 wt % (theory 5.1 wt %) and a K content of 5.8 wt % (theory 6.2 wt %).

Synthesis Example 3

Synthesis of Difunctional OPE (B)

A 20-L volume elongated reactor equipped with a stirrer, thermometer, air inlet tube and baffles was charged with 14 g of copper (II) bromide, 354 g of di-n-butylamine and 4,000 g of methyl ethyl ketone. The contents were stirred at a reaction temperature of 40° C. With stirring, a mixed solution of 270 g of 2,2',3,3',5,5'-hexamethyl-(1,1'-biphenyl)-4,4'-diol and 244 g of 2,6-dimethylphenol in 4,000 g of methyl ethyl ketone (molar ratio of dihydric phenol to monohydric phenol was 1:2) was added dropwise to the reactor over 150 minutes while bubbling air at 2 L/min. An aqueous solution of disodium dihydrogen ethylenediaminetetraacetate was added to the reaction solution to terminate the reaction. Thereafter, the reaction solution was washed with 1N hydrochloric acid and then deionized water. The solution was concentrated on an evaporator and dried in vacuum, leaving 490 g of difunctional OPE (B). The difunctional OPE (B) thus obtained was analyzed by GPC, finding a number average molecular weight of 520 and a weight average molecular weight of 790. It had a hydroxyl equivalent of 260 g/mol.

Synthesis Example 4

Synthesis of OPE-2Gly (B)

A 5-L volume reactor equipped with a stirrer, thermometer and dropping funnel was heated at 100° C. and charged with 300 g of the difunctional OPE (B) obtained above and 2,100 g of epichlorohydrin. Thereafter, 201 g of a 23 wt % ethanol solution of sodium ethoxide was added dropwise over one hour from the dropping funnel. The dropwise addition was followed by 5 hours of stirring. The reaction mixture was washed with deionized water, after which the organic layer was separated. The excess epichlorohydrin was distilled off from the solution. The remainder was vacuum dried, leaving 340 g of OPE-2Gly (B). The OPE-2Gly (B) thus obtained was analyzed by GPC, finding a number average molecular weight of 590 and a weight average molecular weight of 890. It had an epoxy equivalent of 350 g/mol.

Example 3

Synthesis of Potassium Salt of Sulfonic Acid of Polyphenylene Ether Oligomer (B)

A 1-L volume flask equipped with a stirrer, cooling condenser, thermometer and dropping funnel was charged with 175 g of the OPE-2Gly (B) obtained above and 408 g of isobutyl acetate. By stirring for one hour at 80° C., the oligomer was dissolved to form a uniform solution. While the flask was heated to an internal temperature of 80-90° C., an aqueous solution containing 58.4 g of potassium disulfite, 4.0 g of potassium sulfite and 172.4 g of deionized water was added dropwise over one hour. The reaction mixture was stirred for 5 hours under reflux.

The reaction mixture was heated in an oil bath at 140° C. to distill off the water and isobutyl acetate substantially. It was cooled to room temperature, after which 400 g of acetone was added. The mixture was stirred for one hour at room temperature to form a uniform dispersion, which was filtered to remove the unreacted OPE-2Gly (B) dissolved in acetone. The cake-like residue not dissolvable in acetone was washed with acetone and then added to 500 g of deionized water. The mixture was stirred for one hour at room temperature to form a uniform dispersion, which was filtered to remove the remaining potassium disulfite and potassium sulfite in aqueous solution form. The resulting cake-like material was washed with acetone and then dried in a vacuum of 10 mmHg and at a temperature of 80° C. for 6 hours to remove the residual acetone and water. The material was ground in a mortar, obtaining 202 g of a yellowish white fine powder.

The thus obtained potassium salt of sulfonic acid of polyphenylene ether oligomer (B) had the structure of formula (1) wherein $R^2$, $R^3$, $R^4$, $R^7$, $R^8$, $R^9$, $R^{10}$ and $R^{11}$ are methyl, $R^5$, $R^6$, $R^{12}$ and $R^{13}$ are hydrogen, M is potassium, a+b=2, c=0, and d=0. The salt was analyzed by nitric acid decomposition/ICP-AES method, finding an S content of 6.7 wt % (theory 6.8 wt %) and a K content of 8.3 wt % (theory 8.3 wt %).

Synthesis Example 5

Synthesis of OPE-2Gly (C)

A 5-L volume reactor equipped with a stirrer, thermometer and dropping funnel was charged with 118.3 g of 2,2',3,3',5,5'-hexamethyl-(1,1'-biphenyl)-4,4'-diol, 118.3 g of methyl ethyl ketone, and 1,350 g of epichlorohydrin. The contents were heated and stirred at 100° C. for dissolution. Thereafter, 313 g of a 20 wt % ethanol solution of sodium ethoxide was added dropwise over one hour from the dropping funnel. The dropwise addition was followed by 5 hours of stirring. The reaction mixture was washed with deionized water and admitted into a mixture of water/methanol (weight ratio 1/1) whereupon solids precipitated. The precipitate was collected by filtration, washed with a mixture of water/methanol (weight ratio 1/1) and dried in vacuum, leaving 141 g of OPE-2Gly (C). The OPE-2Gly (C) thus obtained was analyzed by GPC, finding a number average molecular weight of 395. It had an epoxy equivalent of 196 g/mol.

Example 4

Synthesis of Potassium Salt of Sulfonic Acid of Polyphenylene Ether Oligomer (C)

A 1-L volume flask equipped with a stirrer, cooling condenser, thermometer and dropping funnel was charged with 98 g of the OPE-2Gly (C) obtained above and 392 g of isobutyl acetate. By stirring for one hour at 80° C., the oligomer was dissolved to form a uniform solution. While the flask was heated to an internal temperature of 80-90° C., an aqueous solution containing 66.7 g of potassium disulfite, 4.0 g of potassium sulfite and 195.6 g of deionized water was added dropwise over one hour. The reaction mixture was stirred for 5 hours under reflux.

The reaction mixture was heated in an oil bath at 140° C. to distill off the water and isobutyl acetate substantially. It was cooled to room temperature, after which 500 g of acetone was added. The mixture was stirred for one hour at room temperature to form a uniform dispersion, which was filtered to remove the unreacted OPE-2Gly (C) dissolved in acetone. The cake-like residue not dissolvable in acetone was washed with acetone and then added to 700 g of deionized water. The mixture was stirred for one hour at room temperature to form a uniform dispersion, which was filtered to remove the remaining potassium disulfite and potassium sulfite in aqueous solution form. The resulting cake-like material was washed with acetone and then dried in a vacuum of 10 mmHg and at a temperature of 80° C. for 6 hours to remove the residual acetone and water. The material was ground in a mortar, obtaining 128 g of a pale yellowish white fine powder.

The thus obtained potassium salt of sulfonic acid of polyphenylene ether oligomer (C) had the structure of formula (1) wherein $R^2$, $R^3$, $R^4$, $R^7$, $R^8$, and $R^9$ are methyl, $R^5$ and $R^6$ are hydrogen, M is potassium, a=0, b=0, c=0, and d=0. The salt was analyzed by nitric acid decomposition/ICP-AES method, finding an S content of 9.2 wt % (theory 10.1 wt %) and a K content of 11.0 wt % (theory 12.4 wt %).

Synthesis Example 6

Synthesis of Organopolysiloxane B-1

In accordance with Preparation Example 1 of JP-A 2003-253109, a 1-liter flask equipped with a stirrer, condenser and thermometer was charged with 91.9 g of hexamethyldisiloxane and 408.1 g of 1,3,5,7-tetramethylcyclotetrasiloxane. While stirring, 15.0 g of conc. sulfuric acid was added to the flask. At the end of addition, stirring was continued for 5 hours at the internal temperature of 20 to 25° C. for ripening. Then, 6.4 g of water was added to the flask to stir the solution for one hour. The mixture was allowed to stand whereupon the aqueous layer separated. After removal of the aqueous layer, the siloxane layer was washed with 5% sodium sulfate aqueous solution four times, whereby it was confirmed that the siloxane layer became neutral. The siloxane layer was heated to the internal temperature of 120° C. under a reduced pressure to remove the matters having a low boiling temperature, and then filtered to remove insoluble matters, thereby obtaining organopolysiloxane B-1. The organopolysiloxane B-1 has only methyl groups and Si—H groups as the substituents bonded to silicon atoms in a molecule and the structure of the following formula:

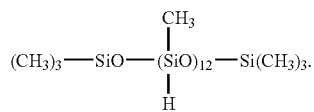

The content of SiH groups was 1.38 mol/100 g. The weight average molecular weight was 950.

Synthesis Example 7

Synthesis of Organopolysiloxane B-2

In accordance with Preparation Example 4 of JP-A 2003-253109, a 1-liter flask equipped with a stirrer, condenser and thermometer was charged with 537.6 g of water and 120 g of toluene and cooled to the internal temperature of 5° C. A dropping funnel was charged with a mixture of 12.6 g of trimethylchlorosilane, 120.1 g of methyldichlorosilane and 36.7 g of diphenyldichlorosilane, which with stirring, was added dropwise to the flask over 2 hours. During the addition, cooling was continued so that the internal temperature was maintained to 20° C. or less. At the end of dropwise addition, stirring was continued for 4 hours at the internal temperature of 20° C. for ripening. The mixture was allowed to stand whereupon the hydrochloric acid aqueous layer separated. After removal of the hydrochloric acid aqueous layer, then, 80 g of 10% sodium carbonate aqueous solution was added to the mixture and the mixture was stirred for 5 minutes. The mixture was allowed to stand whereupon the aqueous layer separated. After removal of the aqueous layer, the mixture was washed with ion exchanged water three times, whereby it was confirmed that the toluene layer became neutral. The toluene solution was heated to the internal temperature of 120°C. under a reduced pressure to remove toluene and matters having a low boiling temperature, and then filtered to remove insoluble matters, thereby obtaining organopolysiloxane B-2. The organopolysiloxane B-2 has methyl groups, Si—H groups and phenyl groups as the substituents bonded to silicon atoms in a molecule and the structure of the following formula:

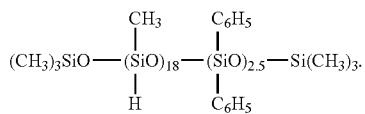

The content of Si—H groups was 1.07 mol/100 g. The weight average molecular weight was 3,600.

Synthesis Example 8

Synthesis of Organopolysiloxane B-3

In accordance with Preparation Example 1 of JP-A 2003-253110 (corresponding to USP 6,706,825 and EP 1342753 B1), a 1-liter flask equipped with a stirrer, condenser and thermometer was charged with 288 g of water and 93 g of toluene and heated to an internal temperature of 80° C. in an oil bath. A dropping funnel was charged with 148 g of phenyltrichlorosilane, 51 g of diphenyldichlorosilane and 13 g of dimethyldichlorosilane, which with stirring, was added dropwise to the flask over one hour. At the end of dropwise addition, stirring was continued for one hour at the internal temperature of 80° C. for ripening. With stirring, 27 g of trimethylchlorosilane was then added dropwise to the flask over 10 minutes. At the end of dropwise addition, stirring was continued for 30 minutes at the internal temperature of 80° C. for ripening. Toluene, 100 g, was then added to the reaction solution, which was allowed to stand while cooling down to room temperature whereupon the aqueous layer separated. After removal of the aqueous layer, a 10% sodium sulfate aqueous solution was combined with the toluene layer. After 10 minutes of stirring, the mixture was allowed to stand for 30 minutes whereupon the aqueous layer separated was removed. This water washing step was repeated until the toluene layer became neutral, whereby the reaction was stopped. With an ester adapter attached to the flask, the toluene layer containing an organopolysiloxane was heated to reflux whereby water was removed from the toluene layer. After the internal temperature reached 110° C., refluxing was continued for a further one hour, followed by cooling to room temperature. The resulting organopolysiloxane solution was filtered of insolubles and subsequently distilled in vacuum to remove the toluene and low molecular weight siloxanes, yielding phenyl group-bearing organopolysiloxane B-3 in solid form.

This phenyl group-bearing organopolysiloxane B-3 contains phenyl and methyl groups as silicon atom-bonded substituent groups within the molecule and has a branched structure. When it is represented by the average compositional formula: $R^1_m R^2_n (OR^3)_p (OH)_q SiO_{(4-m-n-p-q)/2}$, $R^2$ is methyl, m is 0.93, n is 0.62, p is 0, q is 0.03, m+n+p+q=1.58, as in the following formula.

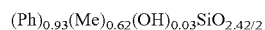

It had a weight average molecular weight of 9,200 and a softening point of 96° C.

In the organopolysiloxanes prepared by Synthesis Examples 6 to 8, the Si—H group content was obtained by measuring the volume of hydrogen gas generated per unit weight of the organopolysiloxane by alkali decomposition method. The weight average molecular weight is the value obtained by converting GPC (gel permeation chromatography) measuring data using the standard curve prepared by polystyrene standard sample.

Examples 5 to 11 and Comparative Examples 1 to 4

Components were combined in a formulation recipe as shown in Tables 1 and 2. The mixture was kneaded on a single screw extruder VS-40 (by Tanabe Plastics Co., Ltd.) at a barrel temperature of 260° C. and pelletized. The pellets were dried at 120° C. for 5 hours, after which they were injection molded into test specimens by an injection molding machine Cycap M-2 (by Sumitomo Heavy Industries, Ltd.) with a clamping force of 75 ton under conditions: a cylinder temperature of 270° C., a mold temperature of 100° C., and a cycle time of 60 sec. The specimens were examined by the tests shown below, with the results shown in Tables 1 and 2.

Tests (1) Izod Impact Strength: According to ASTM D256

(2) Light Transmittance:
A plate of 80 mm×40 mm×3.2 mm (thick) was molded and measured for overall light transmittance according to ASTM D1003.

(3) Burning Test:
A specimen of 3.0 mm thick was examined by the vertical burning test of UL94.

(4) Yellowness Index:
The pellets were dried at 120° C. for 5 hours, after which they were injection molded into a plate of 80 mm×40 mm×3.2 mm (thick) by an injection molding machine Cycap M-2 (by Sumitomo Heavy Industries, Ltd.) under conditions: a clamping force of 75 ton, a cylinder temperature of 300° C., a mold temperature of 100° C., and a cycle time of 3 min (residence molding). The yellowness index (YI) of the plate was measured by a color difference meter SM-3-CH (by Suga Tester Co., Ltd.). At the same time, the yellowness index (YI) of the plate prepared by ordinary molding in (2) was measured. The difference in yellowness index between the ordinary molded plate and the residence molded plate is a change of yellowness index (ΔYI). The smaller the yellowness index change (ΔYI), the better becomes the residence heat tability.

TABLE 2

|   |   | Comparative Example | | | |
|---|---|---|---|---|---|
|   |   | 1 | 2 | 3 | 4 |
| Composition (pbw) | PC resin | 100 | 100 | 100 | 100 |
|   | OPE-Na |   |   | 4 |   |
|   | OPE-K |   |   |   | 4 |
|   | TPP |   | 5 |   |   |
|   | Antioxidant | 0.02 | 0.02 | 0.02 | 0.02 |
|   | Heat stabilizer | 0.02 | 0.02 | 0.02 | 0.02 |
| Tests | Impact strength, J/m | 720 | 250 | 80 | 50 |
|   | Light transmittance, % | 92 | 90 | 79 | 82 |
|   | Burning, UL94 | HB | V-2 | V-2 | V-2 |
|   | ΔYI | 1.2 | 4.2 | 12.5 | 10.8 |

The components used in the compositions of Tables 1 and 2 are as follows.

PC resin
  polycarbonate resin: poly-4,4-isopropylidene diphenyl carbonate, trade name: Iupilon S-3000 (viscosity average molecule weight 21,500), Mitsubishi Engineering-Plastics Corp.

OPE-Na
  Sodium sulfonate of polyphenylene ether oligomer prepared in Example 1

OPE-K
  Potassium sulfonate of polyphenylene ether oligomer prepared in Example 2

TPP
  phosphorus-based flame retardant: triphenyl phosphate, by Daihachi Chemical Co., Ltd.

Antioxidant
  phenolic antioxidant: pentaerythritol tetrakis[3-(3,5-di-tert-butyl-4-hydroxyphenyl)propionate], trade name: IRGANOX 1010, Ciba Specialty Chemicals

TABLE 1

|   |   | Example | | | | | | |
|---|---|---|---|---|---|---|---|---|
|   |   | 5 | 6 | 7 | 8 | 9 | 10 | 11 |
| Composition (pbw) | PC resin | 100 | 100 | 100 | 100 | 100 | 100 | 100 |
|   | OPE-Na | 0.1 | 0.3 |   |   | 0.1 |   | 0.1 |
|   | OPE-K |   |   | 0.1 | 0.3 |   | 0.1 |   |
|   | B-1 |   |   |   |   | 0.2 |   |   |
|   | B-2 |   |   |   |   |   | 0.2 |   |
|   | B-3 |   |   |   |   |   |   | 0.2 |
|   | TPP |   |   |   |   |   |   |   |
|   | Antioxidant | 0.02 | 0.05 | 0.02 | 0.05 | 0.02 | 0.02 | 0.02 |
|   | Heat stabilizer | 0.02 | 0.05 | 0.02 | 0.05 | 0.02 | 0.02 | 0.02 |
| Tests | Impact strength, J/m | 690 | 680 | 700 | 680 | 700 | 700 | 690 |
|   | Light transmittance, % | 91 | 90 | 91 | 89 | 66 | 70 | 75 |
|   | Burning, UL94 | V-1 | V-0 | V-1 | V-0 | V-0 | V-0 | V-0 |
|   | ΔYI | 2.1 | 3.2 | 1.9 | 2.8 | 2.1 | 2.0 | 2.0 |

Heat Stabilizer tris(2,4-di-tert-butylphenyl) phosphate, trade name: Adecastab 2112, Asahi Denka Kogyo K. K.

A comparison of Table 1 with Table 2 reveals that the flame retardant polycarbonate resin compositions within the scope of the present invention are superior in Izod impact strength, overall light transmittance (transparency), flame retardance and residence heat stability (demonstrated by a smaller $\Delta YI$).

Examples 12 to 18 and Comparative Examples 5 to 6

Components were combined in a formulation recipe as shown in Tables 3 and 4. The mixture was kneaded on a single screw extruder VS-40 (by Tanabe Plastics Co., Ltd.) at a barrel temperature of 260° C. and pelletized. The pellets were dried at 110° C. for 5 hours, after which they were injection molded into test specimens by an injection molding machine Cycap M-2 (by Sumitomo Heavy Industries, Ltd.) with a clamping force of 75 ton under conditions: a cylinder temperature of 260° C., a mold temperature of 100° C., and a cycle time of 60 sec. The specimens were examined by the tests shown below, with the results shown in Tables 3 and 4.

Tests (1) Burning Test:

A specimen of 2.0 mm thick was examined by the vertical burning test of UL94.

(2) Izod Impact Strength: According to ASTM D256

(3) Weld Strength:

A specimen having a weld and a weld-free specimen were measured for tensile strength at break for comparing weld strength.

(4) Appearance as Molded:

A weld-free tensile specimen was visually observed in proximity to the gate. The specimen was rated OK (○) when no flow marks were found, fair (Δ) when a few flow marks developed, and poor (X) when flow marks developed.

(5) Mold Deposit:

Molding under the conditions described in Examples was continued 500 shots. After the molding run, the mold was examined whether or not deposits were left.

TABLE 4

|  |  | Comparative Example | |
|---|---|---|---|
|  |  | 5 | 6 |
| Composition (pbw) | PC resin | 100 | 100 |
|  | ABS resin | 10 | 10 |
|  | OPE-Na |  |  |
|  | OPE-K |  |  |
|  | Phosphate |  | 5 |
|  | Antioxidant | 0.02 | 0.02 |
|  | Heat stabilizer | 0.02 | 0.02 |
| Tests | Burning, UL94 | NG | NG |
|  | Impact strength, J/m | 690 | 520 |
|  | Weld-free strength, MPa | 65 | 62 |
|  | Welded strength, MPa | 54 | 39 |
|  | Appearance as molded | ○ | X |
|  | Mold deposit | none | left |

The components used in the compositions of Tables 3 and 4, except ABS resin and phosphate, are the same as in Tables 1 and 2.

ABS Resin

ABS resin CBT-698, Techno Polymer Co., Ltd.

Phosphate

Trixylenyl phosphate (molecular weight=410, phosphor content=7.6 wt %) by Daihachi Chemical Co., Ltd.

A comparison of Table 3 with Table 4 reveals that the flame retardant resin compositions within the scope of the present invention are superior in flame retardance, Izod impact strength, weld strength, outer appearance as molded, and mold deposit.

Japanese Patent Application Nos. 2004-261872, 2004-310851 and 2004-310876 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An alkali metal or alkaline earth metal salt of sulfonic acid of polyphenylene ether oligomer having the structural formula (1):

TABLE 3

|  |  | Example | | | | | | |
|---|---|---|---|---|---|---|---|---|
|  |  | 12 | 13 | 14 | 15 | 16 | 17 | 18 |
| Composition (pbw) | PC resin | 100 | 100 | 100 | 100 | 100 | 100 | 100 |
|  | ABS resin | 10 | 10 | 10 | 10 | 10 | 10 | 10 |
|  | OPE-Na | 0.3 | 1.0 |  |  | 0.3 |  | 0.3 |
|  | OPE-K |  |  | 0.3 | 1.2 |  | 0.3 |  |
|  | B-1 |  |  |  |  | 1.0 |  |  |
|  | B-2 |  |  |  |  |  | 1.0 |  |
|  | B-3 |  |  |  |  |  |  | 1.0 |
|  | Phosphate |  |  |  |  |  |  |  |
|  | Antioxidant | 0.02 | 0.02 | 0.02 | 0.02 | 0.02 | 0.02 | 0.02 |
|  | Heat stabilizer | 0.02 | 0.02 | 0.02 | 0.02 | 0.02 | 0.02 | 0.02 |
| Tests | Burning, UL94 | V-1 | V-0 | V-1 | V-0 | V-0 | V-0 | V-0 |
|  | Impact strength, J/m | 540 | 510 | 580 | 550 | 540 | 570 | 550 |
|  | Weld-free strength, MPa | 64 | 65 | 67 | 66 | 64 | 67 | 53 |
|  | Welded strength, MPa | 55 | 50 | 59 | 54 | 54 | 60 | 55 |
|  | Appearance as molded | ○ | ○ | ○ | ○ | ○ | ○ | ○ |
|  | Mold deposit | none | none | none | none | none | none | none |

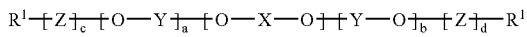

wherein —[O—X—O]— has the structural formula (2):

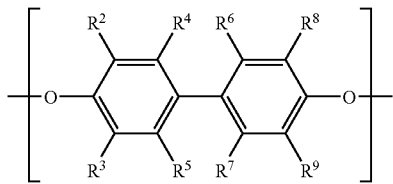

wherein each of $R^2$, $R^3$, $R^4$, $R^8$ and $R^9$ which may be the same or different is a halogen atom, alkyl of up to 6 carbon atoms or phenyl, each of $R^5$, $R^6$ and $R^7$ which may be the same or different is a hydrogen atom, halogen atom, alkyl of up to 6 carbon atoms or phenyl, —[Y—O]— is a structure of one type having the structural formula (3) or a random array of structures of at least two types having the structural formula (3):

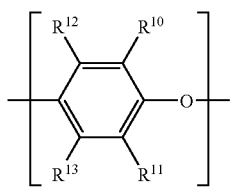

wherein each of $R^{10}$ and $R^{11}$ which may be the same or different is a halogen atom, alkyl of up to 6 carbon atoms or phenyl, each of $R^{12}$ and $R^{13}$ which may be the same or different is a hydrogen atom, halogen atom, alkyl of up to 6 carbon atoms or phenyl, Z is a divalent organic group of 1 to 6 carbon atoms which may contain an oxygen atom, $R^1$ essentially contains a structure having the structural formula (4):

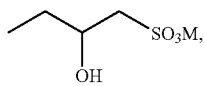

$R^1$ may be, in part, replaced by hydrogen atoms or glycidyl groups, M is an alkali metal and/or alkaline earth metal, each of a and b is an integer of 0 to 100, and each of c and d is an integer of 0 to 20.

2. The alkali metal or alkaline earth metal salt of sulfonic acid of polyphenylene ether oligomer of claim 1 wherein —[O—X—O]— has the structural formula (5):

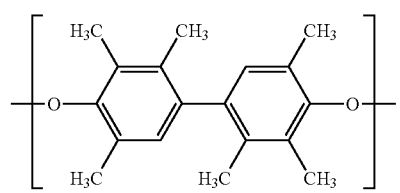

—[Y—O]— is a structure having the structural formula (6) or (7) or a random array of structures having the structural formulae (6) and (7):

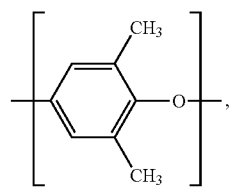

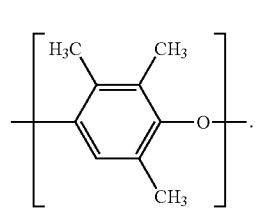

3. The alkali metal or alkaline earth metal salt of sulfonic acid of polyphenylene ether oligomer of claim 1 wherein M in formula (4) is sodium and/or potassium.

4. A method for preparing the alkali metal or alkaline earth metal salt of sulfonic acid of polyphenylene ether oligomer of claim 1, comprising the step of reacting epoxy groups at opposite ends of a polyphenylene ether oligomer with a compound selected from the group consisting of sodium hydrogen sulfite, potassium hydrogen sulfite, sodium disulfite, and potassium disulfite, in a polar organic solvent and in the presence of water, said polyphenylene ether oligomer having the structural formula (8):

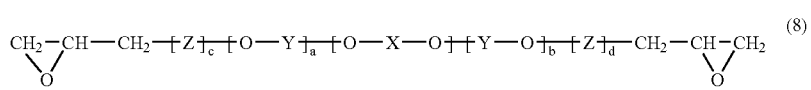

wherein —[O—X—O]— has the structural formula (2):

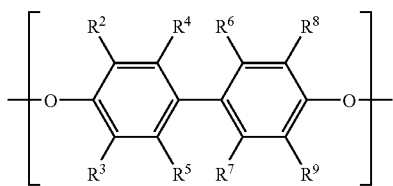

wherein each of $R^2$, $R^3$, $R^4$, $R^8$ and $R^9$ which may be the same or different is a halogen atom, alkyl of up to 6 carbon atoms or phenyl, each of $R^5$, $R^6$ and $R^7$ which may be the same or different is a hydrogen atom, halogen atom, alkyl of up to 6 carbon atoms or phenyl, —[Y—O]— is a structure of one type having the structural formula (3) or a random array of structures of at least two types having the structural formula (3):

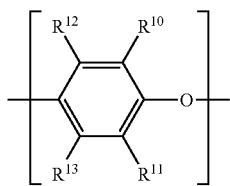

wherein each of $R^{10}$ and $R^{11}$ which may be the same or different is a halogen atom, alkyl of up to 6 carbon atoms or phenyl, each of $R^{12}$ and $R^{13}$ which may be the same or different is a hydrogen atom, halogen atom, alkyl of up to 6 carbon atoms or phenyl, Z is a divalent organic group of 1 to 6 carbon atoms which may contain an oxygen atom, each of a and b is an integer of 0 to 100, and each of c and d is an integer of 0 to 20.

5. A flame retardant resin composition comprising 100 parts by weight of a polycarbonate resin and 0.01 to 3.0 parts by weight of an alkali metal or alkaline earth metal salt of sulfonic acid of polyphenylene ether oligomer having the structural formula (1):

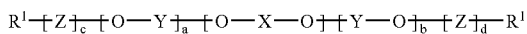

wherein —[O—X—O]— has the structural formula (2):

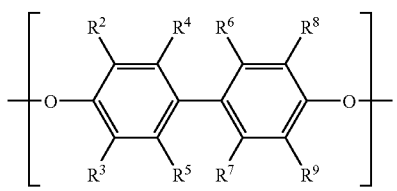

wherein each of $R^2$, $R^3$, $R^4$, $R^8$ and $R^9$ which may be the same or different is a halogen atom, alkyl of up to 6 carbon atoms or phenyl, each of $R^5$, $R^6$ and $R^7$ which may be the same or different is a hydrogen atom, halogen atom, alkyl of up to 6 carbon atoms or phenyl, —[Y—O]— is a structure of one type having the structural formula (3) or a random array of structures of at least two types having the structural formula (3):

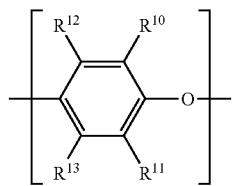

wherein each of $R^{10}$ and $R^{11}$ which may be the same or different is a halogen atom, alkyl of up to 6 carbon atoms or phenyl, each of $R^{12}$ and $R^{13}$ which may be the same or different is a hydrogen atom, halogen atom, alkyl of up to 6 carbon atoms or phenyl, Z is a divalent organic group of 1 to 6 carbon atoms which may contain an oxygen atom, $R^1$ essentially contains a structure having the structural formula (4):

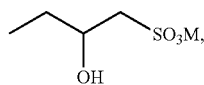

$R^1$ may be, in part, replaced by hydrogen atoms or glycidyl groups, M is an alkali metal and/or alkaline earth metal, each of a and b is an integer of 0 to 100, and each of c and d is an integer of 0 to 20.

6. The flame retardant resin composition of claim 5, further comprising, per 100 parts by weight of the polycarbonate resin, 0.01 to 5.0 parts by weight of a silicone compound flame retardant.

7. The flame retardant resin composition of claim 5, further comprising, per 100 parts by weight of the polycarbonate resin, 5 to 40 parts by weight of a rubber-modified styrene/(meth)acrylonitrile graft copolymer obtained by polymerizing at least a styrenic monomer and (meth)acrylonitrile in the presence of rubber.

8. The flame retardant resin composition of claim 7, further comprising 0.01 to 5.0 parts by weight of a silicone compound flame retardant per 100 parts by weight of the polycarbonate resin and the rubber-modified styrene/(meth)acrylonitrile graft copolymer combined.

9. The flame retardant resin composition of claim 5, wherein in formula (1) representing the alkali metal or alkaline earth metal salt of sulfonic acid of polyphenylene ether oligomer, —[O—X—O]— has the structural formula (5):

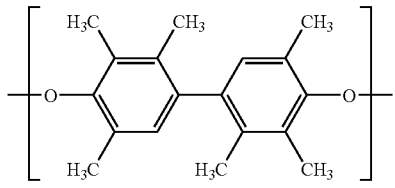
(5)

—[Y—O]— is a structure having the structural formula (6) or (7) or a random array of structures having the structural formulae (6) and (7):

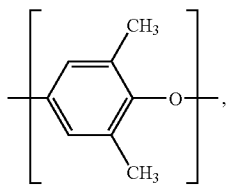
(6)

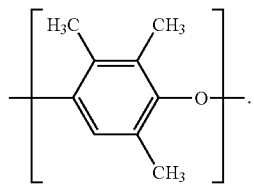
(7)

10. The flame retardant resin composition of claim 5, wherein M in formula (4) included in formula (1) representing the alkali metal or alkaline earth metal salt of sulfonic acid of polyphenylene ether oligomer is sodium and/or potassium.

11. An article obtained by molding the flame retardant resin composition of claim 5.

* * * * *